Feb. 12, 1952 — W. H. DUMBLE — 2,585,303
OVERSHOT, TOOL STRING KNUCKLE JOINT
Filed Aug. 31, 1946
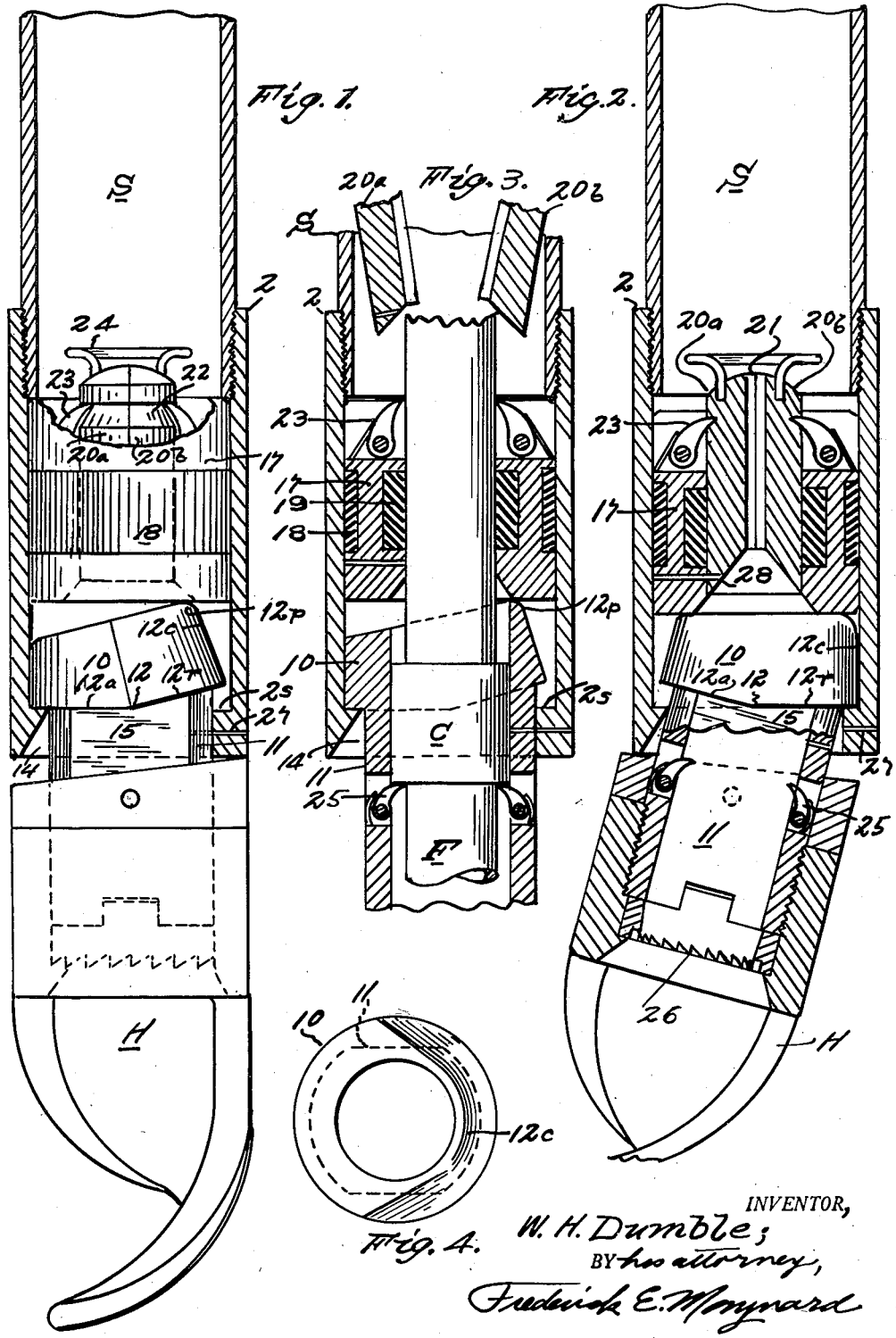
INVENTOR,
W. H. Dumble;
BY his attorney,
Frederick E. Maynard Patented Feb. 12, 1952

2,585,303

UNITED STATES PATENT OFFICE 2,585,303

OVERSHOT TOOL STRING KNUCKLE JOINT

William H. Dumble, Bakersfield, Calif.

Application August 31, 1946, Serial No. 694,378

5 Claims. (Cl. 294—86)

This invention is a fishing tool apparatus, for use in deep earth holes or wells, of the type shown by Baker Patent No. 1,718,771.

It is an object of this invention to greatly simplify the liquid circulating, knuckle joint of the above mentioned patent by wholly eliminating any pin and socket form of positive connection of the tool device to the body of the apparatus. And an object is to eliminate any form of guided piston rod feature such as shown by Baker, supra.

Importantly, an object of the invention is to provide a tool carrying section and a hydraulically driven piston which are directly interengageable so that no lateral thrust, spacial cam parts are needed. Also a purpose, here, is to provide a piston all of the effort of which is expended in a straight, axial direction onto an immediately adjacent top corner of a head part of the tool section and which latter has a fulcrum on which it see-saws under the vertical presser piston.

Another object is to provide a tool section which is so combined with the main body element of the apparatus as to be capable of bodily axial shift as distinguished from any form of pin, or ball, and socket hinge which requires much and careful machining.

A further purpose of the invention is to provide a knuckle, tool joint that is very compact and of particularly short length by reason of elimination of piston rods and long cam features.

Also, it is an aim of the invention to provide a knuckle, tool joint whose parts will telescopically receive and grapple the upper end of a well hole. Another object is to provide a means for milling off the ragged edge of the fish end if, and when possible, to facilitate its entrapment by the knuckle tool section and provide a pulling means therein. In this connection a purpose of the invention is to provide a knuckle, tool joint having means to pack off the intruded fish end when this is practical and desirable.

The invention resides in certain advancements in the tool, knuckle joint art as set forth in the ensuing disclosure and having, with the above, additional objects and advantages as hereinafter developed, and whose constructions, combinations, and details of means and the manner of operation will be made manifest in the following description of the herewith illustrative embodiment: it being understood that variations may be exercised within the spirit of the invention as it is claimed in conclusion hereof.

Fig. 1 is an elevation of the tool joint; partly in axial section. Fig. 2 is a longitudinal section thereof; the section being tilted. Fig. 3 is an axial section showing the joint parts in fish pulling position. Fig. 4 is a top plan of the tool section head.

The knuckle joint as set out includes a tubular body 2 suitably attachable to the lower end of a pipe string S for circulating and pressure liquid. Projecting from the lower end of said body is a short, tubular tool section 11 having a flattened portion 15 tilting in a complementary slot 14 across the lower end of the body 2; the lower end of the tool section being adapted for attachment of any desired implement or tool, such as the illustrated wall hook H.

In order that the tool section may have desired bodily shift in the body 2 there is no positive pin or ball and socket connection of the tool section to the body. Instead, the tool section has an enlarged head 10 with an annular, bottom ledge having a diametrical, fulcruming edge 12 —herein called the fulcrum. The ledge has one, flat, anvil-forming face 12a at a right angle from the joint axis to one side of the head, whilst from the other side of said fulcrum a relief face 12r pitches upward, at a suitable obliquity, to the relative (right-hand) side of the head which has a conic surface 12c so that as the head see-saws on its fulcrum 12 the head can move toward the body wall. The slot 14 is extended to the left to provide clearance for the tool section 11 in tilting action. The conic face 12c of the head extends to and merges with a high peak 12p of the head so that a straight downward pressure on the peak will see-saw the head and its body section 11 on the fulcrum 12.

The head ledge faces 12a and 12r are engageable with and supported on an annular, internal shoulder 2s in the lower end of the bore of the hollow body 2 and bordering the guiding slot 14. Fig. 1 shows the anvil face 12a of the head resting in normal, lowering position of the joint parts, which is also the position for an upward jarring function of the body shoulder 2s when this is used as a hammer to jolt the anvil forming head of the section 11. Further, the shoulder takes the load of the section 11 and a fish part F which is caught and being pulled from the well hole.

A tubular, fluid pressure actuated means, of the general type shown by Baker, supra, to act directly on the head 10 of the tilting section 11, is provided and is characterized as a very short piston 17, packed and slidably fitted in the bore of the body 2 in a position immediately above the head 10 of the tool section 11 and directly supported by and on the uppermost surface of the peak 12p which rounds off to merge with the conic side of the bead. This direct engagement of the bottom end face of the piston with the slightly eccentric peak of the stem head eliminates need of a piston rod and long cam features of knuckle joints of the Baker principle. The working surface of contact between the presser piston 17 and the peak 12p results in side thrust of immaterial in degree while the head seesaws on its fulcrum on the shoulder 2s. The piston of this embodiment, Fig. 2, comprises an outer tubular cylinder with external packing 18 sealing the body bore and having an inner concentric packing 19 sealing an inner, concentric core cylinder formed of two, matched sections 20a—20b having a small, central, axial restrictive orifice 21 to control liquid flow down to the hollow section 11.

The core cylinder (20a—20b) is provided with external notches 22 at opposite sides for reception of spring dogs 23, pivoted in the upper end of the cylindric piston 17, which hold the core piston in place while heavy fluid pressure may be set up on the piston assembly to force it straight down on the peak 12p of the stem when this is to be tilted; whereby to push the bottom end of the wall hook far out from the body to hook onto the fish F as the tool string S is rotated with the object of working the top end of the fish into axial position in the wall hook socket; this being an over-shot form of fishing tool.

The core piston sections are slidable as an assembled unit into the bore of the outer cylinder 17 and are normally under expansive pressure of a suitable spring device 24 so that if and when the core piston is upwardly ejected from the outer cylinder the freed core sections will be instantly spread apart as shown in Fig. 3. The dislodgement of the orifice forming core piston will allow a centered fish F to pass through the hollow section 11 and through the piston cylinder 17. If the fish has a diameter of about the diameter of the dislodged core piston then the packing 19 will seal on the intruded fish, Fig. 3.

Means are provided in the bore of the section 11 for hooking under a shoulder or collar C as is commonly used for connecting pipe strings. Figs. 2 and 3, show inwardly springing dogs 25 mounted in the wall of the tubular section 11 and when a collar C has passed these dogs they will close in under the collar and thus lock the fish F in axial position for pulling from the well hole.

To facilitate the entry of the fish end into the socket of the section 11 there is fixedly mounted against the bottom end of the said section a circular mill 26 which will operate to cut off ragged spurs that may obstruct the entry of the top end of the fish into the said socket. The mill may be clamped in place by the hub of the applied wall hook H.

When the fish has been finally centered in the socket of the said section 11 the tool string may be lowered to set the slidable core piston 20a—20b down on the fish with such pressure as to force the core piston up and out of the outer piston cylinder 17; whereby to permit copious flow of liquid down the fish to aid in breaking it from formation in the well hole.

If desired, the section 11 may be fastened by one or more shear pins 27, Fig. 1, and likewise the core piston 20a—20b may be shear pinned at 28 to the main or carrier piston 17.

What is claimed is:

1. A tubular shell having at its lower end an internal guide, a tool joint member pivotally supported in the shell at a level above said guide and having a stem portion below its pivot axis fitted and swinging to and fro in the guide, the said member projecting down through in the guide without relative rotation around the axis of the shell, and a hydraulically actuated piston in the shell and operative on said member to tilt it in the guide said member having spaced stop parts at the ends of the guide to engage the same and prevent axial shift of the axially alined joint member in the guide, and said member having an overshot grab sleeve screwed on its lower end.

2. The combination set out in claim 1, and including an internal end mill bit interlocked with the lower end of said member and being clamped in place by said sleeve.

3. A tool string knuckle joint having a stem member with a head having a topmost abutment corner off to one side of its longitudinal axis, a shell having a pivot portion on which said stem is tiltably supported and said topmost corner being above the horizontal plane of the axis on which said stem tilts, and a piston operative in the shell and having an abutment face engageable with said topmost corner and operative to depress it in a generally vertical arcuate path about said axis.

4. In a knuckle joint for a well pipe tool string; a tubular body attachable at its top to a part of said string, a hollow section pivotally supported in and by said body and adapted for attachment of a fishing tool, a fluid presser piston shiftable axially in the body for tilting the said section and including a dislodgeable core to permit descent of said section and said body in overshot position along a fish part; the core consisting of a set of matched, longitudinal members forming a restricted-flow passageway.

5. In a knuckle joint for a well pipe tool string: a tubular body attachable to a part of the said string, a hollow section pivotally supported in and by said body and adapted for attachment of a fishing tool, a fluid presser piston shiftable axially in said body for tilting said section and having a dislodgeable core; the said piston having a bore in which the core is fitted, and packing lining the bore to seal onto a complementary fish part onto which the piston is functionally telescoped.

WILLIAM H. DUMBLE.

REFERENCES CITED

The following references are of record in the file of this patent:

UNITED STATES PATENTS

| Number | Name | Date |
|---|---|---|
| 1,594,668 | Gates et al. | Aug. 3, 1926 |
| 1,696,378 | Brauer | Dec. 25, 1928 |
| 1,718,771 | Baker | June 25, 1929 |
| 1,738,819 | Cormier | Dec. 10, 1929 |
| 1,800,490 | Young | Apr. 14, 1931 |
| 2,026,295 | Baker | Dec. 31, 1935 |